United States Patent [19]

Miller

[11] Patent Number: 5,692,481
[45] Date of Patent: Dec. 2, 1997

[54] METHOD AND APPARATUS FOR REDUCING CONTAMINANTS IN EXHAUST GASES OF AN ENGINE

[75] Inventor: Robert N. Miller, Acworth, Ga.

[73] Assignee: Lockheed Corporation, Bethesda, Md.

[21] Appl. No.: 575,698

[22] Filed: Dec. 19, 1995

Related U.S. Application Data

[63] Continuation-in-part of Ser. No. 245,327, May 18, 1994.

[51] Int. Cl.$^6$ .................................................. F02M 7/00
[52] U.S. Cl. .......................................................... 123/539
[58] Field of Search .............................. 123/539, 195 A, 123/198 E; 204/157.1

[56] References Cited

U.S. PATENT DOCUMENTS

| | | | |
|---|---|---|---|
| 4,182,663 | 1/1980 | Vaseen | 204/157.1 |
| 4,195,606 | 4/1980 | Wallis et al. | 123/539 |
| 4,434,771 | 3/1984 | Slomnicki | 123/539 |
| 4,519,357 | 5/1985 | McAllister | 123/539 |
| 5,010,869 | 4/1991 | Lee | 123/539 |
| 5,487,874 | 1/1996 | Gibboney | 123/539 |

FOREIGN PATENT DOCUMENTS

| | | |
|---|---|---|
| 0320762 | 12/1987 | European Pat. Off. . |
| 0347129 | 6/1988 | European Pat. Off. . |
| 0485822 | 11/1990 | European Pat. Off. . |
| 0549900 | 11/1991 | European Pat. Off. . |
| 62-121711 | 11/1985 | Japan . |
| 2051512 | 8/1988 | Japan . |
| 6228228 | 1/1992 | Japan . |

OTHER PUBLICATIONS

Journal of Organometallic Chemistry, vol. 288, (1985) pp. 63–67 Synthesis and Crystal Structure of a Chiral ansa–Zirconocene Derivative with Ethylene–Bridged Tetrahydroindenyl Ligands.

Primary Examiner—Marguerite McMahon
Attorney, Agent, or Firm—Eric R. Katz

[57] ABSTRACT

A method and apparatus for reducing contaminants in exhaust gases of an internal combustion engine are provided wherein the a light source is provided for producing radiant energy which converts oxygen in air inducted into the internal combustion engine to ozone. The ozone increases the efficiency of combustion of fuel by the internal combustion engine thereby reducing the amount of hydrocarbons and carbon monoxide in the exhaust gases.

11 Claims, 2 Drawing Sheets

METHOD AND APPARATUS FOR REDUCING CONTAMINANTS IN EXHAUST GASES OF AN ENGINE

This application is a Continuation-in-Part application of U.S. patent application Ser. No. 08/245,327, filed May 18, 1994.

BACKGROUND OF THE INVENTION

1. Field of the Invention

The present invention generally relates to a method and apparatus for reducing the level of contaminants in exhaust gases generated by an internal combustion engine, and more particularly, to such a method and apparatus wherein radiant energy is employed to convert oxygen in air to ozone at an air induction port of the engine to provide a more complete combustion of fuel and improved efficiency without the need for major modifications to the engine.

2. Background

It is well known that internal combustion engines, particularly automobile and truck engines, do not provide complete combustion of their hydrocarbon fuels. This incomplete combustion results in the production and release of contaminants into the atmosphere, such as carbon monoxide and hydrocarbons. A major cause of incomplete combustion is the unavailability of sufficient oxidizing power in the air.

The recent passage of the Clean Air Act requires significant reductions in the amount of contaminants being released into the atmosphere. In order to comply with these requirements, restrictions on the use of automobiles and trucks are being proposed, such as, employer compelled car pooling, HOV lanes, increased use of mass transit as well as rail lines and similar actions limiting automobile and truck utilization.

An alternative to diminished automobile and truck usage is increasing the efficiency of the internal combustion engine. This approach presents a considerable challenge because studies show that 70% of automobile originated pollution is contributed by only 30% of the vehicles on the road, these vehicles typically being older models having inefficient engines that inherently produce a lot of pollution. Moreover, these older vehicles often times have difficulty passing required emission tests, resulting in an increased cost to the owner for tune-ups or new catalytic converters, such maintenance procedures sometimes failing to adequately cure the problem so that the vehicle still cannot pass the required emissions test.

In addition, while considerable gains have been in recent years to reduce the amount of contaminants in the exhaust gases of the internal combustion engine of vehicles such as automobiles and trucks, it is difficult and expensive to further increase the efficiency of engines now being designed for use in new vehicles, even though exhaust emissions of automobiles and trucks currently being manufactured do not meet proposed Environmental Protection Agency standards.

As a solution to increasing the efficiency of the internal combustion engine, it has been proposed in U.S. Pat. Nos. 1,333,836 and 1,725,661 to provide ozone producing apparatus in association with the air intake of the carburetor. Ozone, being a very efficient oxidizer, increases the completeness of combustion of fuel by the engine thereby reducing contaminants in automobile exhaust gases and increasing efficiency.

These above-noted, known arrangements for generating ozone are complicated as well as expensive and cannot be easily installed in a new engine during production nor easily retro-fitted to an existing engine. Further, because these known arrangements utilize a large alternating current which is applied between plates separated by a flow of air to generate ozone gas, oxides of nitrogen are produced which are caustic pollutants, thereby minimizing the beneficial effects these arrangements.

In Wallis, Jr. et al., U.S. Pat. No. 4,195,606, combustion air for an internal engine is treated to activate the oxygen molecules prior to mixing it with the fuel by photochemically activating the oxygen with ultraviolet radiation from a germicidal lamp at a frequency of about 2537 angstroms. However, in the Wallis, Jr. et al. invention, no ozone is produced by the germicidal lamp, as confirmed by the lamp manufacturer. Thus, Wallis et al. actually teach away from the present invention by stressing that the preferred range is 2000 to 3000 angstroms, which does not include the 1850 angstrom ozone generating wavelength of the present invention.

SUMMARY OF THE INVENTION

Accordingly, it is an object of the present invention to provide a method and apparatus for reducing contaminates in the exhaust gases of an internal combustion engine using a hydrocarbon based fuel, such as gasoline, methanol or diesel, wherein radiant energy is employed to convert oxygen in air to ozone at an air induction port of the engine to provide a more complete combustion of fuel and improved efficiency without the need for major modifications to the internal combustion engine.

Another object of the present invention is to provide a method and apparatus for reducing contaminants in automobile or truck exhaust gases which is inexpensive to employ and manufacture, simple in structure and operation as well as easily installed in new engine or retro-fitted to existing vehicle engines.

A particular advantageous feature of the present invention is that it not only produces more complete combustion of the fuel to thereby reduce the level of contaminants in exhaust gases, but it also improves engine efficiency and fuel milage. Unlike the action of catalytic converters located in the exhaust pipes, the added energy is released inside the engine as part of the combustion process.

A further particularly advantageous feature of the present invention is that it provides a relatively inexpensive way to reduce pollution from those automobiles which cause the most pollution and are most likely to fail an emission test.

Another particularly advantageous feature of the present invention is that the apparatus for reducing contaminants in the exhaust gases of internal combustion engines does not produce oxides of nitrogen during the generation of ozone. This feature is achieved by using ultraviolet radiation to generate ozone which is used to enhance combustion by the internal combustion engine, whereas previously employed methods of generating ozone, such as electrical discharge methods as discussed above, generate oxides of nitrogen.

Yet another advantageous feature of the present invention is that is can be applied to variety of different types of internal combustion engines, including but not limited to, jet engines as well as reciprocating engines. In addition the invention can not only be retrofitted to existing engines but also incorporated into newly designed engines.

These and other objects, advantages and features of the present invention are achieved, according to one embodiment thereof, by using an ultraviolet light emitting lamp which emits light having a wavelength of about 185 nanometers so that air going into the carburetor or fuel injection system of an internal combustion engine is partially converted to ozone thereby increasing the efficiency of the engine and reducing contaminants in the automobile's exhaust gases.

According to one aspect of the present invention, the ultraviolet lamp is preferably located downstream of the air filter of the internal combustion engine and adjacent the intake of the carburetor or fuel injection system of the engine.

According to one embodiment of the present invention, there is provided an apparatus comprising: at least one light source for producing radiant energy which converts oxygen in air inducted into the engine to ozone, the at least one light source being a mercury vapor arc lamp which emits light having a wavelength of about 185 nanometers; a transformer for driving the at least one light source; and a connector for connecting the transformer to an electrical system of the engine; a tachometer for sensing the speed of rotation of the engine; and a controller for varying the amount of ozone generated by the lamp by varying one of a voltage and current applied to the lamp by the voltage converter in proportion to the speed of rotation of the engine as sensed by the tachometer; wherein the ozone increases the efficiency of combustion of fuel by the engine thereby reducing the amount of hydrocarbons and carbon monoxide in the exhaust gases.

According to another embodiment of the present invention, there is provided an apparatus for reducing contaminants in exhaust gases of an engine, the apparatus comprising: first and second light sources for producing radiant energy which converts oxygen in air inducted into the engine to ozone, the first and second light sources each converting air to ozone at a level which is less than required for full combustion by the engine; a transformer for driving the first and second light sources; a connector for connecting the transformer to an electrical system of the engine; a tachometer for sensing the speed of rotation of the engine; and a controller for continuously operating the second light source when the engine is operating, for turning off the first light source when the speed of rotation of the engine is below a predetermined speed and for turning on the first light source when the speed of rotation of the engine is at least at the predetermined speed; wherein the ozone increases the efficiency of combustion of fuel by the engine thereby reducing the amount of hydrocarbons and carbon monoxide in the exhaust gases.

According to yet another embodiment of the present invention, there is provided an apparatus comprising: first and second light sources for producing radiant energy which converts oxygen in air inducted into the engine to ozone, the first and second light sources each converting air to ozone at a level which is less than required for full combustion by the engine; a transformer for driving the first and second light sources; a connector for connecting the transformer to an electrical system of the engine; an engine load sensor for sensing an engine load of the engine; and a controller for selectively operating the first light source based on the engine load of the engine and for continuously operating the second light source when the engine is operating; wherein the controller turns off the first light source when the engine load of the engine is below a predetermined level and wherein the controller turns on the first light source when the engine load of the engine is at least at the predetermined level; and wherein the ozone increases the efficiency of combustion of fuel by the engine thereby reducing the amount of hydrocarbons and carbon monoxide in the exhaust gases.

DETAILED DESCRIPTION OF THE PREFERRED EMBODIMENT(S)

Figure 1:
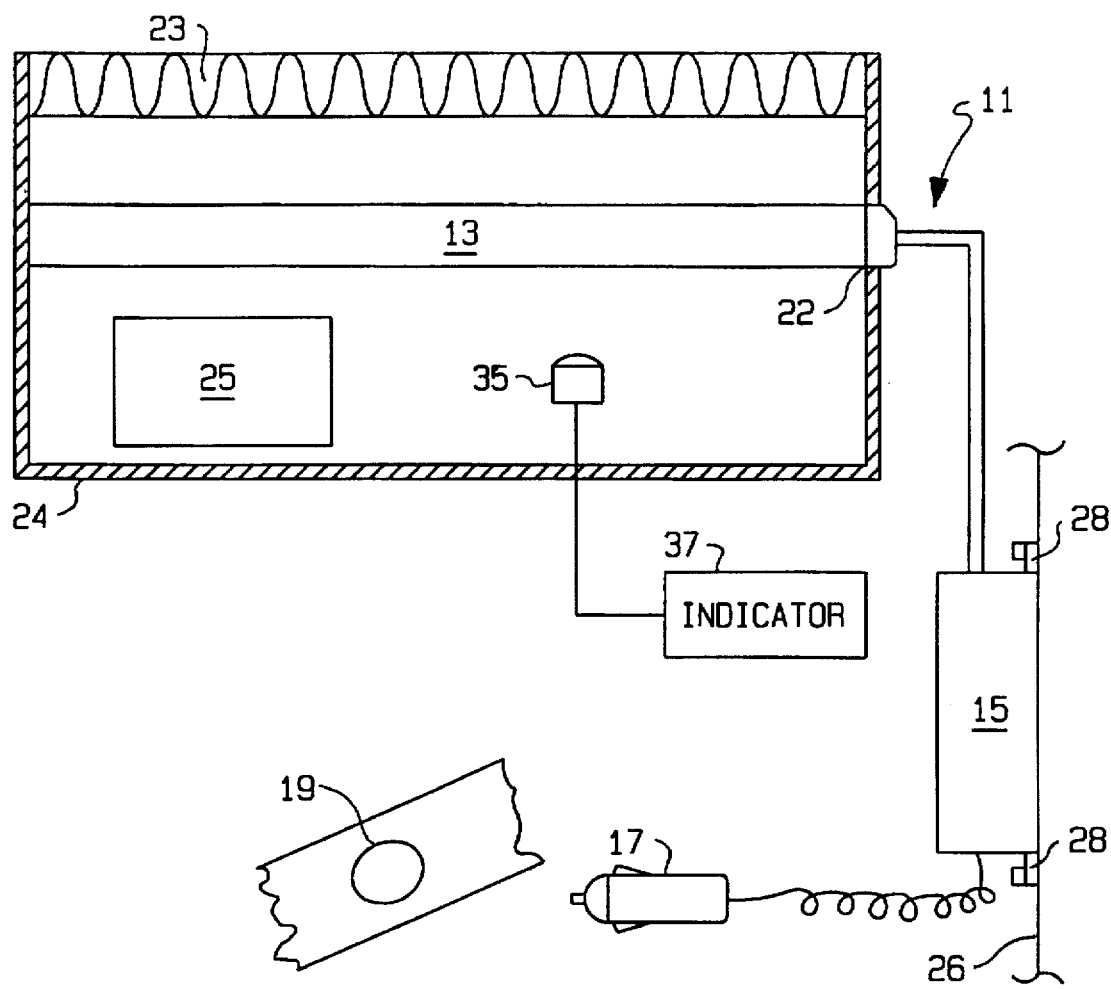
FIG. 1 is a side view, partially in section of one embodiment of the apparatus of the present invention.

Referring to FIG. 1, one embodiment of an apparatus of the present invention is illustrated generally at 11. The apparatus 11 comprises an ultraviolet light emitting lamp 13, for example, a mercury vapor arc lamp having an envelope of glass for transmitting ultraviolet light having a wavelength of about 185 nanometers. The type of glass required to transmit light at a frequency of about 185 nanometers is fused silica or its equivalent, synthetic quartz. A source of fused silica lamps is GTE Products Corporation, Sylvania Lighting Center, Danvers, Mass. 01923. The lamp 13 is connected to a Bodine Model 12R25E/GS transformer 15 which converts 12 volt battery power to the voltage and frequency required to operate the lamp 13.

As shown in FIG. 1, the transformer 15 can be connected to the electrical system of an automobile by, for example, a plug 17 which is inserted into the cigarette lighter 19 of the automobile. This arrangement is particular attractive when retro-fitting the apparatus 11 to an existing late model vehicle. Alternatively, the transformer 15 can be directly connected to the electrical system of the automobile by splicing into the hot wire (not shown) of the system, for example, as original equipment on a new vehicle.

In the embodiment of the apparatus 11 as illustrated by FIG. 1, it is preferred that the lamp 13 is position between an air filter 23 and air intake duct 25 of a carburetor or fuel injection system (not shown) of the internal combustion engine so that ozone is not entrained by the air filter 23.

In order to retro-fit the apparatus 11 to an existing older model vehicles, the air filter casing 24 is opened and the lamp 13 is placed between the air filter 23 and the air intake duct 25 and the electrical wire leads of the lamp 13 are placed so that they pass beneath the air filter cover (not shown) so that they are routed out of the casing 24 between the casing 24 and its removable cover (not shown) and into the engine compartment where they are connected to the transformer 15.

Figure 3:
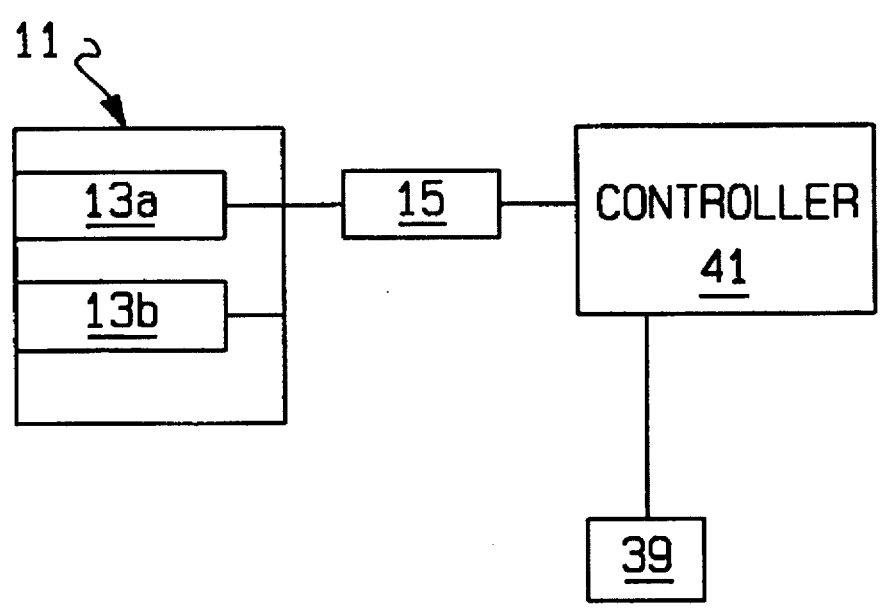
FIG. 3 is a block diagram illustrating alternative embodiments of the present invention wherein a plurality of ozone generating lamps are successively turned on at different and increasing predetermined engine loads or engine speeds.

However, if the lamp is too long to fit in this space, at least one hole 22 is drilled into the casing 24 holding the air filter 23 at the air intake duct 25. The hole 22, preferably positioned between the air filter 23 and the intake 25, has a diameter substantially equal to the diameter of the lamp 13. The lamp 13 is slid through the hole 22, into the interior of the casing 24 and is positioned between the air filter 23 and air intake 25. A sealant, such as tape or caulking, is applied at the hole 22 so that little or no air can seep in through the hole 22 when occupied by the lamp 13. In lieu of the foregoing procedure requiring the formation of hole 22 a plurality of smaller length lamps 13a, 13b, as described hereinafter with particular reference to FIG. 3, are used.

The transformer 15 is then fastened to a side panel 26 of the engine compartment of the vehicle by means of fasteners 28 such as screws or the like. The plug 17 is then inserted into the cigarette lighter 19 of the vehicle or alternatively, the transformer 15 is connected directly to the hot wire of the electrical system of the vehicle.

In order to assure that the lamp is operating, a photo-detector 35 is located adjacent to the lamp 13 and connected to an indicator 37 which provides an indication when the photo-detector 35 fails to sense light energy from the lamp 13. The detector 35 and indicator 37 are not essential, however, such an option is recommended, especially if the present invention is employed in lieu of known catalytic converters currently in use on automobiles and trucks rather than in combination with such catalytic converters.

Table 1 compares the results obtained utilizing the ozone generating apparatus 11 with the results of a base line test conducted without the ozone generating apparatus 11.

TABLE 1

|  | BASELINE | WITH OZONE | % REDUCTION |
|---|---|---|---|
| CARBON MONOXIDE (%) | 0.28 | 0.02 | 92.8% |
| HYDROCARBONS (ppm) | 154 | 12 | 92.2% |

In addition, test vehicles have experienced an increase in gas mileage in the range of between 3 to 10% as well as an increase in power output.

All emission tests conducted to date show a small residual hydrocarbon content in the exhaust gases ranging from 4 to 12 parts per million (ppm). With fine tuning, the residual hydrocarbon content is expected to be reduced to a range of 1 to 4 ppm.

The foregoing emission test results indicate that no ozone is passing through the engine without being utilized in the oxidation of the fuel. An Oriel Ozone Test Kit may be used to verify the absence of ozone. It consists of a hand operated pump and detector tube. The piston-type pump draws a sample of exhaust gas through the detector tube. The tube indicates the concentration of ozone by the length of color change in the tube. It measures the concentration of ozone in a range of 0.05 to 5 ppm.

Figure 2:
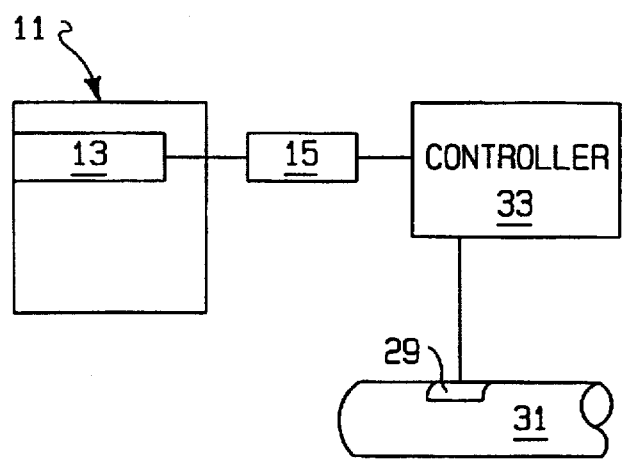
FIG. 2 is a block diagram illustrating a control arrangement for the apparatus of the present invention.

If traces of ozone are detected in the exhaust gases, a control arrangement can be employed according to a further embodiment of the present invention as shown in FIG. 2, wherein an ozone sensor 29 is installed in the exhaust pipe 31. The ozone sensor 29 is connected to a controller 33 which switches off the ozone generating lamp 13 whenever ozone is detected in the exhaust gases and switched back on when no ozone is present. The controller 33 can be a simple switching arrangement such as, for example, a transistor which is controlled by the output of ozone sensor 29 or as complex as an engine control computer which analyzes the output of the ozone sensor 29 in conjunction with other engine parameter such as load, throttle position, rpm and the like to turn the lamp 13 on and off. Alternatively, the controller 33 can vary the amount of ozone generated by the lamp 13 by varying either the voltage or current applied to the lamp 13 by the voltage converter 15 based on inputs receive from the ozone sensor 29.

Although it is possible to continuously monitor the exhaust emissions with ozone sensors such as the Fyrite II combustion analyzer (VWR Scientific Co.), and continuously adjust the current flow to the ultraviolet lamp 13, it is more economical to use the further embodiments of the present invention which will now be described with particular reference to FIG. 3 wherein two or more relatively small ozone generating lamps 13a, 13b, which each convert air to ozone at a level which is less then required for full combustion by the internal combustion engine, are employed and one lamp is operated continuously and the other lamp is turned on only when the engine speed or engine load reaches a predetermined level.

In this embodiment, a controller 41 is connected to a tachometer or engine load sensor 39 to receive an input indicative of the current engine speed or engine load, respectively. When the controller 41 senses an engine speed or engine load at or above a predetermined level, the controller 41 turns on lamp 13b. In addition to a two lamp configuration, a plurality of lamps can be used such that one lamp is continuously operated and each additional lamp is turned on in succession as different and increasing levels of rotation of the engine or engine load are sensed by the controller 41 so that all the lamps are operating when the engine speed or engine load is at the highest predetermined level and sufficient ozone is generated to assure good combustion so that no excess hydrocarbons or carbon monoxide is generated.

Alternatively, a single lamp 13 can be employed and the controller 41 can vary the amount of ozone generated by the lamp 13 by varying either the voltage or current applied to the lamp 13 by the voltage converter 15 based on inputs receive from the controller 41.

Although the present invention has been described with particular reference to its preferred embodiments, it should be understood that many variations and modifications will now be obvious to those skilled in that art, and it is preferred, therefore, that the scope of the invention be limited, not by the specific disclosure herein, but only by the appended claims.

What is claimed is:

1. An apparatus for reducing contaminants in exhaust gases of an engine, the apparatus comprising:

a light source for producing radiant energy which converts oxygen in air inducted into the engine to ozone;

a transformer for driving the at least one light source; and a connector for connecting the transformer to an electrical system of the engine;

wherein the ozone increases the efficiency of combustion of fuel by the engine thereby reducing the amount of hydrocarbons and carbon monoxide in the exhaust gases.

2. An apparatus according to claim 1, wherein the light source is a ultraviolet light emitting lamp.

3. An apparatus according to claim 2, wherein the ultraviolet light emitting lamp is a mercury vapor arc lamp which emits light having a wavelength of about 185 nanometers.

4. An apparatus according to claim 3, further comprising:

an ozone sensor for sensing ozone in the exhaust gases of the engine; and a controller for extinguishing the at least one light source when a predetermining amount of ozone is sensed in the exhaust gases of the engine and for turning on the at least one light source when less than the predetermined amount of ozone is sensed in the exhaust gases of the engine.

5. An apparatus according to claim 3, further comprising:
   a tachometer for sensing the speed of rotation of the engine; and
   a controller for varying the amount of ozone generated by the lamp by varying one of a voltage and current applied to the lamp by the voltage converter in proportion to the speed of rotation of the engine as sensed by the tachometer.

6. An apparatus according to claim 1, wherein the engine is an internal combustion engine.

7. An apparatus according to claim 1, wherein the connector is a plug for insertion into a cigarette lighter of a vehicle having the engine.

8. An apparatus according to claim 1, wherein the at least one light source is positioned adjacent one of a carburetor air intake and fuel injection air intake of the engine.

9. A method for reducing contaminants in exhaust gases of an engine, the method comprising the steps of:
   generating radiant energy for converting oxygen in air at an air induction port of the engine to ozone;
   passing the air at the air induction port by the radiant energy to convert oxygen in the air to ozone to provide a more complete combustion of fuel and improved efficiency.

10. A method according to claim 9, wherein the radiant energy is generated by a mercury vapor arc lamp which emits light having a wavelength of about 185 nanometers.

11. A method for reducing contaminants in exhaust gases of an engine, the method comprising the steps of:
   generating radiant energy for converting oxygen in air at an air induction port of the engine to ozone;
   sensing an engine load of the engine; and
   varying an intensity of the radiant energy in proportion to the engine load of the engine.

* * * * *

UNITED STATES PATENT AND TRADEMARK OFFICE
CERTIFICATE OF CORRECTION

PATENT NO. : 5,692,481
DATED : December 2, 1997
INVENTOR(S) : Robert N. Miller

It is certified that error appears in the above-identified patent and that said Letters Patent is hereby corrected as shown below:

Column 2, line 37, change "engine" to --engines--;

Claim 1, line 3, change "a" to --at least one--;

Claim 4, line 5, change "predetermining" to --predetermined--.

Signed and Sealed this

Tenth Day of March, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.  :  5,692,481

DATED     :  December 2, 1997

INVENTOR(S) :  Robert N. Miller

It is certified that errors appear in the above-identified patent and that said Letters Patent is hereby corrected as shown below:

```
On the cover page, item [56], under References Cited, U.S. Patent
    Documents, add:
2,146,265    1/1982     Moore        123/539
2,960,975    11/1960    Bergstrom    123/539
4,308,844    1/1982     Persinger    123/539
4,386,595    6/1983     Young        123/536
4,556,020    12/1985    Hickling     123/536
```

Signed and Sealed this

Fifteenth Day of September, 1998

Attest:

BRUCE LEHMAN

*Attesting Officer*     *Commissioner of Patents and Trademarks*